Nov. 12, 1963  E. CLEMENTS  3,110,114

TRAILER LEVEL

Filed Oct. 3, 1960

INVENTOR
ERRETTE CLEMENTS
BY
Harrington A. Lackey
ATTORNEY 3,110,114
TRAILER LEVEL
Errette Clements, Nashville, Tenn.
(563 Blackstone Ave., Madison, Tenn.)
Filed Oct. 3, 1960, Ser. No. 59,916
5 Claims. (Cl. 33—207)

This invention relates to a leveling apparatus, and more particularly to an apparatus for leveling a trailer vehicle.

Heretofore, the method of leveling the floor of a trailer vehicle has been accomplished by placing a conventional spirit level on top of the floor in the interior of a trailer vehicle. Such a method involves repeated journeys of one person back and forth between the interior of the trailer to observe the level and the outside forward end of the trailer for adjusting its elevation. Even the cooperation of two persons in carrying out this method of leveling a trailer involves inconvenience in movements and communication.

It is therefore an object of this invention to overcome the disadvantages above enumerated by providing a trailer leveling apparatus which is adapted to be applied to the undersurface of the trailer and can be easily observed while the forward end of the trailer is lowered or elevated until the trailer floor is level.

Another object of this invention is to provide a trailer leveling apparatus employing a pair of vertically adjustable standards adapted to engage the undersurface of the trailer and freely suspend a spirit level equidistant between the standards.

A further object of this invention is to provide a leveling apparatus which may be expanded to engage the surface to be leveled at remote points in order to more accurately level the surface, and which may be collapsed to occupy a comparatively small space when not in use.

Another object of this invention is to provide a trailer leveling apparatus which is self-supporting in operative position beneath the trailer vehicle.

Figure 1:
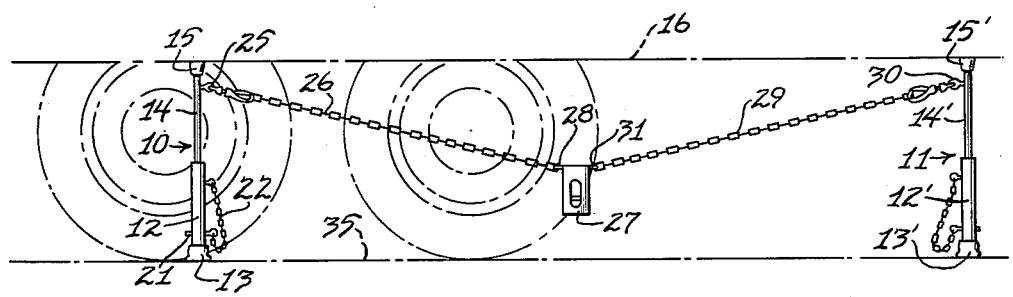
Figure 2:
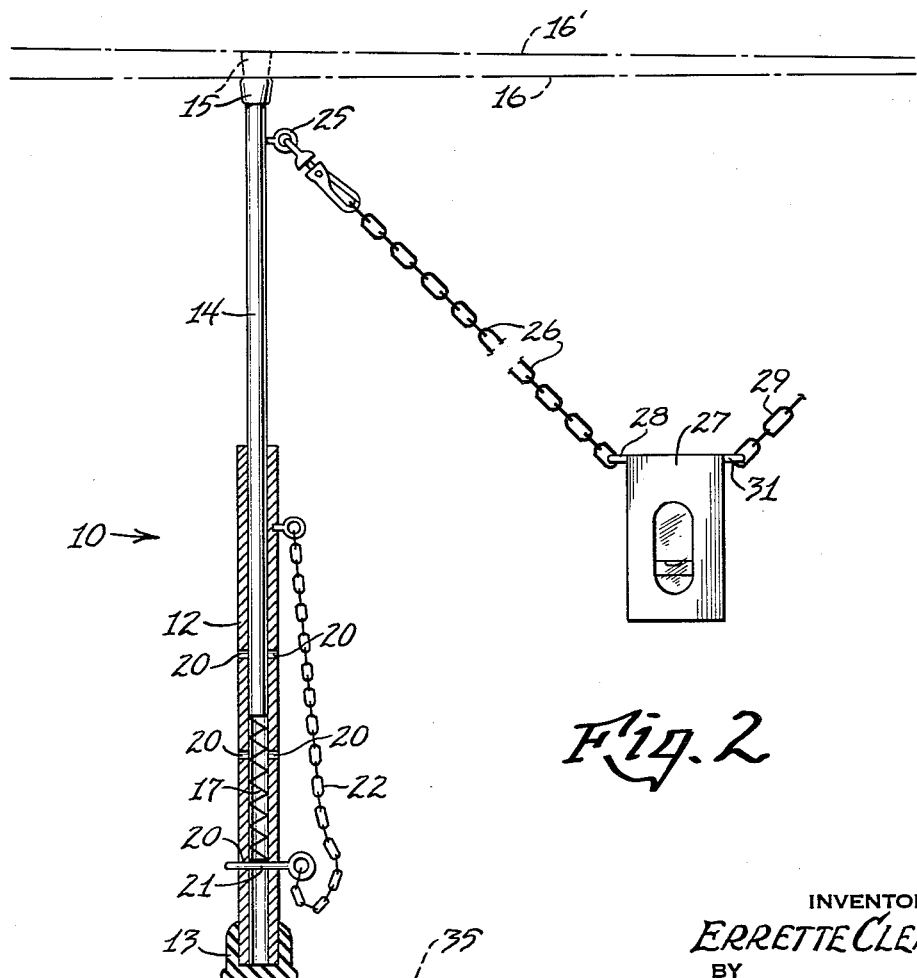

Further objects and advantages of the invention will be apparent from the following description taken in conjunction with the drawings, wherein:

FIG. 1 is a side elevation of the invention in operative position engaging the undersurface of a trailer vehicle, shown in phantom; and FIG. 2 is an enlarged fragmentary side elevation showing the spirit level and one standard partially in section.

Referring now to the drawings in more detail, the apparatus includes a pair of vertically adjustable standards 10 and 11 of identical construction. Considering the construction of the standard 10, it comprises a tubular support member or socket 12 having an open top, and having its bottom covered by a ground-engaging element, such as a hard rubber shoe 13. Adapted to be telescopingly received through the open top of the support member 12 is a shaft 14. The upper end of the shaft 14 comprises a cap or head 15 for firmly engaging a surface 16 to be leveled, such as the undersurface of a trailer vehicle. The bottom of the shaft 14 is biased upwardly by means of a coil spring 17 contained within the support member 12.

Spaced at vertical intervals in the walls of the tubular support member 12 are laterally aligned pairs of apertures 20, each pair being adapted to slidably receive a pin 21, which may be permanently secured to the support member 12 by means of a chain 22. The coil spring 17 may rest on the shoe 13, or the spring 17 may rest on the pin 21 inserted through a pair of mating apertures 22 at various levels to adjust the vertical position of the shaft 14. It is also possible for the pin 21 to extend between any pair of adjacent coils in the spring 17 to provide finer vertical adjustments for the shaft 14.

Pivotally connected to an eye bolt 25, or other similar fixture, mounted on the shaft 14 a short distance beneath the cap 15, is a linking member, such as a chain 26. The other end of the chain 26 is pivotally connected to one side of a spirit level 27 by means of a loop or ear 28 having an opening therethrough. In a like manner, a second linking member or chain 29, of equal length and weight to the chain 26, is pivotally connected to an eye bolt or fixture 30 mounted on the shaft 14' at a distance below the cap 15' corresponding to the distance between the eye bolt 25 and the cap 15. The other end of the chain 29 is pivotally connected to the spirit level 27 through a loop or ear 31 in the same corresponding position on the spirit level 27 as the ear 28. Thus, the spirit level 27 is always located equidistant between the standards 10 and 11 when it is freely suspended.

The operation of the invention is as follows:

Assuming that a trailer is parked and its undersurface assumes the unlevel position disclosed by the dashed line 16' in FIG. 2, the telescoping shafts 14 and 14' are roughly adjusted to fit the vertical spacing between the undersurface 16' and the ground surface 35 by inserting the pin 21 through the appropriate pair of apertures 20 and either beneath or through the coils of the spring 17. When the telescoping shafts 14 and 14' are properly adjusted and located in spaced upright positions beneath the trailer, the caps 15 and 15' will be urged by the springs 17 into firm engagement with the undersurface 16' so that the standards 10 and 11 are self-supporting. Moreover, the standards 10 and 11 must be remotely spaced sufficiently that the spirit level 27 will be freely suspended by means of the chains 26 and 29.

With the undersurface of the vehicle assuming the position of 16', the spirit level 27 will show that the undersurface or floor of the trailer will be tilted upward toward the rear, and consequently, the cap 15 will be higher than the cap 15'. By elevating the forward end of the trailer gradually, the spirit level 27 will soon show the exact position 16 when the trailer is level. As the under surface of the trailer is tilted, the rear portion will depress the cap 15 and force the shaft 14 into the support member 12 to gradually compress the spring 17, while the forward portion of the vehicle will be raised to cause the corresponding spring in standard 11, not shown, to raise the shaft 14' to maintain the cap 15, in firm engagement with the bottom of the trailer vehicle. Of course, if the forward end of the trailer vehicle were too high, it would be lowered until the spirit level 27 registers that the vehicle is level, and the shaft 14 would move upward while the shaft 14' would be forced down, in the reverse manner as that previously described.

After the trailer is level, the standards 10 and 11 may be easily removed by slightly lowering the telescoping shafts 14 and 14' and removing the standards 10 and 11 from the bottom of the trailer 16. The standards 10 and 11, the chains 26 and 29 and the spirit level 27 may then be moved together to collapse the entire apparatus for storage within a minimum of space.

It will also be observed that this apparatus employs only two points or small areas of contact with the surface 16 to be leveled, namely the caps 15 and 15'. Moreover, the caps 15 and 15' are remotely spaced at a distance many times greater than the width of the spirit level 27. The effect of the remotely spaced small areas of contact is to magnify the degree of accuracy in leveling a surface such as 16 and 16', particularly if the surface is irregular because of deformities or foreign matter.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. A leveling apparatus comprising first and second vertically adjustable standards, each standard comprising a tubular support member and a shaft, one end of said shaft being telescopingly received in said support member and the other end of said shaft being adapted to engage a surface to be leveled, an element on said support member for engaging a supporting surface spaced from said surface to be beveled, means in said tubular support member to bias said shaft into engagement with said surface to be leveled, a spirit level, and means for freely suspending said level equidistant between said shafts so that said spirit level will register level when the surface engaged by said shaft is level, said standards are spaced apart, and said elements engage said supporting surface.

2. A leveling apparatus comprising first and second vertically adjustable standards, each standard comprising a tubular support member and a shaft, one end of said shaft being telescopically received in said support member and the other end of said shaft being adapted to engage a surface to be leveled, an element on said support member for engaging a supporting surface spaced from said surface to be leveled, means in said tubular support member to bias said shaft into engagement with said surface to be leveled, a spirit level, a first linking member, one end of said first linking member being pivotally connected to said level and the other end of said first linking member being pivotally connected to the shaft of said first standard, a second linking member, one end of said second linking member being connected to said level in a position corresponding to said first linking member, and the other end of said second linking member being pivotally connected to the shaft of said second standard in a position corresponding to said first linking member, said first and second linking members being of equal length and weight.

3. The invention according to claim 2 in which means are provided for vertically adjusting the normal inoperative position of each shaft relative to its tubular support member.

4. A trailer leveling apparatus comprising a pair of vertically adjustable standards, each standard comprising a tubular support member and a shaft, one end of said shaft being telescopically received in said tubular support member, a head on the other end of said shaft adapted to engage the under surface of said trailer, a ground-engaging element on said support member, a spring in said tubular support member for biasing said shaft upwardly, a spirit level, a first collapsible linking member, one end of said first linking member being pivotally connected to said level and the other end of said linking member being pivotally connected to the shaft of said first standard at a predetermined distance below said head, a second collapsible linking member, one end of said second linking member being pivotally connected to said level at a corresponding position to the pivotal connection of said first linking member with said level, the other end of said second linking member being pivotally connected to the shaft of said second standard at the same distance below the head of said second shaft as the pivotal connection of said first linking member is below the head of said first shaft, said first and second linking members being of equal length and width.

5. The invention according to claim 4 in which said tubular support member is provided with vertically spaced apertures and a pin adapted to be inserted through any aperture to engage said spring for vertical adjustment of the corresponding standard.

References Cited in the file of this patent

UNITED STATES PATENTS

| | | |
|---|---|---|
| 921,470 | Sheppard | May 11, 1909 |
| 2,562,679 | Ort | July 31, 1951 |
| 2,680,302 | Standal | June 8, 1954 |